United States Patent
Kerseboom

(10) Patent No.: US 10,924,510 B2
(45) Date of Patent: Feb. 16, 2021

(54) METHOD AND SYSTEM FOR A DISTRIBUTED EARLY ATTACK WARNING PLATFORM (DEAWP)

(71) Applicant: Praesideo B.V., Utrecht (NL)

(72) Inventor: Jan Willem Olger Valentijn Kerseboom, Utrecht (NL)

(73) Assignee: PRAESIDEO B.V., Utrecht (NL)

( * ) Notice: Subject to any disclaimer, the term of this patent is extended or adjusted under 35 U.S.C. 154(b) by 297 days.

(21) Appl. No.: 16/063,126

(22) PCT Filed: Dec. 16, 2016

(86) PCT No.: PCT/EP2016/002123
§ 371 (c)(1),
(2) Date: Jun. 15, 2018

(87) PCT Pub. No.: WO2017/102088
PCT Pub. Date: Jun. 22, 2017

(65) Prior Publication Data
US 2019/0260802 A1    Aug. 22, 2019

Related U.S. Application Data

(60) Provisional application No. 62/268,634, filed on Dec. 17, 2015.

(51) Int. Cl.
| | |
|---|---|
| *H04L 29/06* | (2006.01) |
| *H04B 3/54* | (2006.01) |
| *G06F 21/55* | (2013.01) |

(52) U.S. Cl.
CPC .......... *H04L 63/18* (2013.01); *G06F 21/55* (2013.01); *H04B 3/54* (2013.01); *H04L 63/1408* (2013.01);
(Continued)

(58) Field of Classification Search
CPC ............ H04L 63/1408; H04L 63/1433; H04L 63/1441; H04L 63/1458; H04L 63/18; G06F 21/55
See application file for complete search history.

(56) References Cited

U.S. PATENT DOCUMENTS

| | | | |
|---|---|---|---|
| 2002/0032880 A1* | 3/2002 | Poletto | ............... H04L 63/1416 714/4.1 |
| 2002/0083175 A1 | 7/2002 | Afek et al. | |
| 2011/0125873 A1* | 5/2011 | Pacella | ............... H04L 63/1408 709/219 |

FOREIGN PATENT DOCUMENTS

WO    2015026318 A1    2/2015

OTHER PUBLICATIONS

Softcoding, Wikipedia, Jun. 2015, pp. 1-2.
(Continued)

*Primary Examiner* — Minh Dinh
(74) *Attorney, Agent, or Firm* — Hoffmann & Baron, LLP

(57) ABSTRACT

A system, method and computer program product for a distributed early attack warning platform (DEA WP), including a plurality of protected computer devices coupled to a first communications network; a plurality of monitoring node devices respectively coupled between the plurality of protected computer devices and the first communications network and configured to monitor data communications transmitted over the first communications network between the plurality of protected computer devices; and a second communications network separate from the first communications network coupled to the plurality of monitoring node devices. Based on the monitored data communications transmitted over the first communications network, the plurality of monitoring node devices act as a swarm configured to communicate information over the second communications network regarding potential cyber threats on the plurality of
(Continued)

protected computer devices or the first communications network and possible countermeasures to the potential cyber threats.

15 Claims, 14 Drawing Sheets

(52) U.S. Cl.
CPC ...... *H04L 63/1433* (2013.01); *H04L 63/1441* (2013.01)

(56) References Cited

OTHER PUBLICATIONS

IEEE Standards Association, "IEEE Standard for Broadband over Power Line Networks: Medium Access Control and Physical Layer Specifications." IEEE Std 1901-2010 (2010): 1-1586.

\* cited by examiner

METHOD AND SYSTEM FOR A DISTRIBUTED EARLY ATTACK WARNING PLATFORM (DEAWP)

This application is the U.S. National Phase of, and Applicant claims priority from, International Patent Application Number PCT/EP2016/002123 filed 16 Dec. 2016, which claims priority from U.S. 62/268,634 filed 17 Dec. 2015, each of which is incorporated herein by reference.

The present invention claims benefit of priority to U.S. Provisional Patent Application Ser. No. 62/268,634 of Jan Willem Olger Valentijn Kerseboom, entitled "METHOD AND SYSTEM FOR A DISTRIBUTED EARLY ATTACK WARNING PLATFORM (DEAWP)," filed on Dec. 17, 2016, the entire disclosure of which is hereby incorporated by reference herein.

In recent years, systems and methods for communications network attack detection have been developed. However, such existing systems and methods are not robust with respect to detecting attacks and synchronizing gathered data related thereto.

Therefore, there is a need for a method and system that address the above and other problems with systems and methods for communications network attack detection.

The above and other problems are addressed by a system according to claim 1, a computer implemented method according to claim 7 and a computer program product according to claim 13. Preferred embodiments are subject to the subclaims.

The present invention generally relates to systems and (computer implemented) methods for communications network attack detection, and more particularly to a method and system for a distributed early attack warning platform (DEAWP) for detecting attacks and synchronizing gathered data over a separate communications network via a power line network connection, and the like, to connected nodes, in order to protect the network as a whole and systems connected thereto, and the like.

Illustrative embodiments of the present invention provide a (computer implemented) method and a system for a distributed early attack warning platform (DEAWP) including detecting attacks and synchronizing gathered data over a separate communications network via a power line network connection, and the like (e.g., any other suitable types of network connections), to connected nodes, in order to protect the network as a whole and systems connected thereto, and the like.

Accordingly, in an illustrative aspect, there is provided a system, (computer implemented) method and computer program product for a distributed early attack warning platform (DEAWP), including a plurality of protected computer devices, also referred to as node protected systems, coupled to a first communications network; a plurality of monitoring node devices, also referred to as routers or nodes, respectively coupled between the plurality of protected computer devices and the first communications network and configured to monitor data communications transmitted over the first communications network between the plurality of protected computer devices; and a second communications network separate from the first communications network coupled to the plurality of monitoring node devices. Based on the monitored data communications transmitted over the first communications network, the plurality of monitoring node devices act as a swarm configured to communicate information over the second communications network regarding potential cyber-threats on the plurality of protected computer devices or the first communications network and possible countermeasures to the potential cyber-threats.

The first communications network is a wired or wireless communications network, and the second communications network is a powerline communications network.

The swarm of monitoring node devices are configured for collectively controlling choices and adaptations regarding the potential cyber-threats.

The potential cyber-threats include hacking attacks, denial of service attacks, computer virus infections, and infection attempts by autonomous malicious or non-malicious software and hardware of one or more of the plurality of protected computer devices.

The swarm is configured to coordinate countermeasures over only the second communications network.

The swarm is configured to gather information regarding possible hostile entity or entities related to the cyber-threats over the second communications network.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the present invention. Accordingly, the drawings and descriptions are to be regarded as illustrative in nature, and not as restrictive.

The embodiments of the present invention are illustrated by way of example, and not by way of limitation, in the figures of the accompanying drawings, in which like reference numerals refer to similar elements, and in which.

Figure 1:
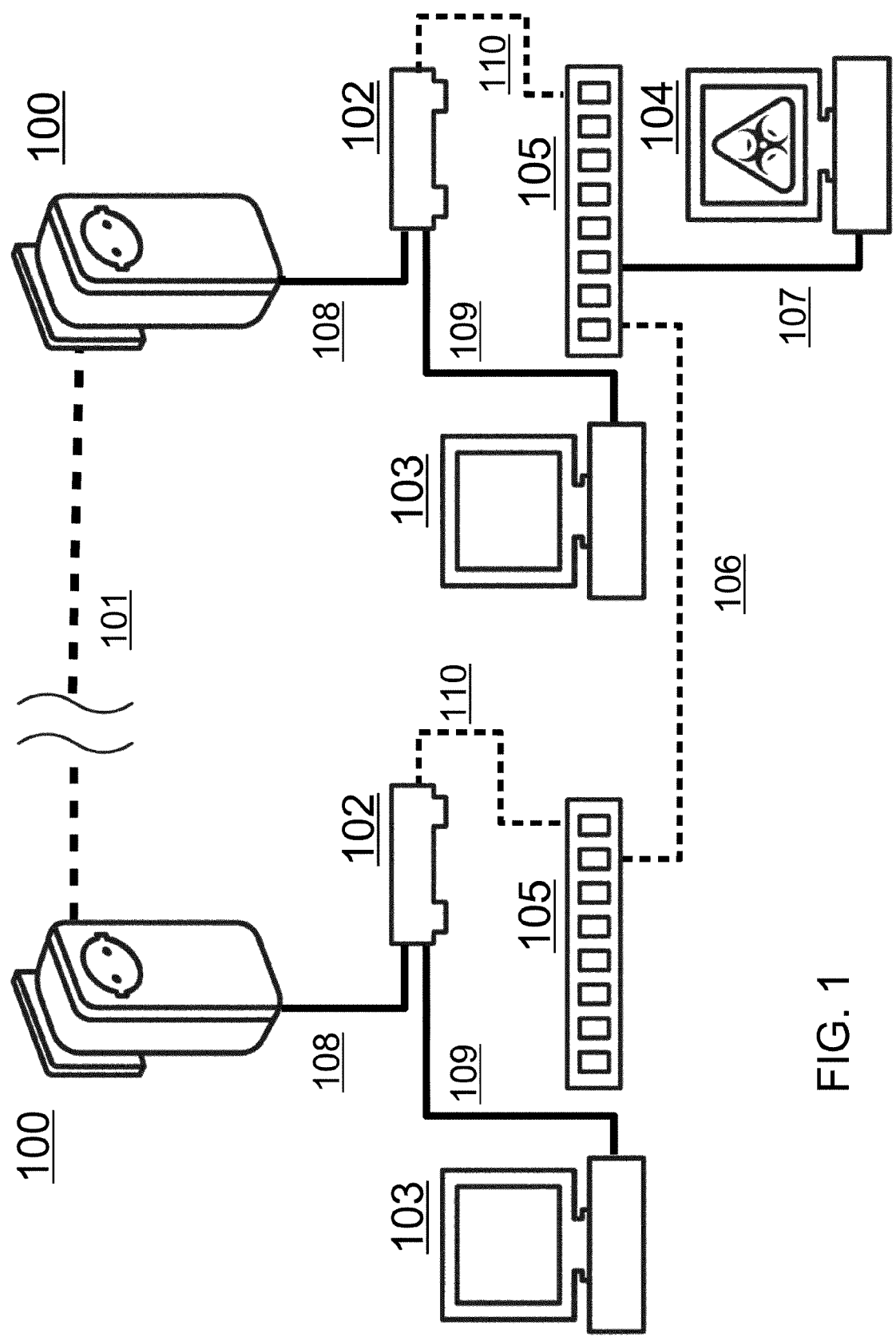
FIG. 1 is used to illustrate a system and method for a distributed early attack warning platform (DEAWP), according to an illustrative embodiment of the present invention.

A system and method for a distributed early attack warning platform (DEAWP) are described below. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

The present invention includes recognition that within a communication network, the time data needs to go from point A to point B theoretically is one third of the speed of light. In reality, data gets delayed or halted at every node or router in the communication network the data passes, therefore substantially reducing such theoretical speed.

Within data security, it is important to know "what is going on" within the realm of one's digital environment. A commonly used tactic to attack a network is to first scan what is there. In this process, called "staging", all suitable systems are approached to find out what their functions are, and to find out if they provide extra information for possible targeting of a specific system.

Due to its nature of having small variations in distance to its core router, a network of connected systems, as a whole, can unlikely ever be scanned or attacked at exactly the same time. Therefore, theoretically, one system could warn other connected systems of what is to come when attacked or probed. However, for one system to try to warn another when attacked generally provides a disadvantageous single point of failure, as all the data would be sent via the same network as the attack is being carried on.

This forms a bottleneck, rendering such technique unreliable for such warning to pass through to other systems. Therefore, there is a need for a method and system that addresses such a bottleneck issue.

Advantageously, the distributed early attack warning platform (DEAWP) of the present invention includes a method and system that evades such a problem of having to use the same channel to both acknowledge a scan or attack, and to send data to peers thereof to make the peers aware of such a scan or attack, and the like.

The present invention also includes recognition that most attacks in a network are targeted to find vulnerable machines, but not always. Some contain behavior that attack the integrity of a network, as a whole, as well as the systems therein.

Advantageously, the system and method of the distributed early attack warning platform (DEAWP) of the of the present invention circumvents such problem, as an early warning system is separated from the normally used network, for example, by using another network alongside the normally used network, and the like.

Such parallel network structure works by employing two networks that are effectively integrated into one system.

The first network is connected to a regular Transmission Control Protocol TCP)/lnternet Protocol (IP) network.

The second network is connected, for example, to a TCP/IP network over powerline connection, and the like (e.g., any other suitable types of TCP/IP network connections).

Advantageously, the DEAWP system has a way of communicating outside the boundaries of the common TCP/IP network by integrating such two separate systems, and therefore providing a safe and robust way to communicate to its peers on such separate networks.

In addition, because the distributed early attack warning platform (DEAWP) nodes can pre-warn other systems over a clear channel, the DEAWP can stop the effectiveness of a distributed attack. The extra benefit this has is that a power line connection is not as much limited by extra nodes interfering with its connection speed. It can therefore communicate faster to its peers in case of a detected scan or attack and take counter measures before the attack reaches the other "regular" network.

Advantageously, this results in so called active measures that can be taken to protect the network as a whole from intrusion or attacks as the connected systems have been pre-warned. This is advantageous because in some cases, an attack makes it impossible for a victimized system to communicate anything to the outside systems. The attacked system will therefore not be able to warn others. Using a separate channel, as with the DEAWP, for warning other systems in the network, advantageously, allows the attacked system for functioning to pre-warn other systems, even though the attacked system itself can no longer do so through the standard TCP/IP channel.

As mentioned above, there is a need for a method and system that addresses the noted bottleneck problem, that is a method and system that evades the conflict of having to use the same channel to both acknowledge a scan or attack, and to send data to its peers to make them aware of such a scan or attack. The DEAWP solves such a problem by employing a swarming principle, wherein each of the nodes used to protect the systems behind them, can be used in various ways, depending on circumstances. In order to do so, the nodes need a clear channel to communicate. The swarming principle adds another benefit, wherein all suitable DEAWP nodes are equal and can perform each and every task that is needed to halt an attack and warn the person(s) or machine (s) responsible for the health and security of the attacked network, as well as keeping and propagating their findings of targeted attacks or probes.

In addition, when an infected system is found, the DEAWP node can counterattack and stop all communications from that system, protecting the other systems within that network. The DEAWP node can know what is a probe or attack compared to regular harmless network activity by running a variety of services targeted specifically to gather data, distribute them and collectively decide.

One has to understand that from the outside these nodes indiscriminately look like any other regularly network connected system. The difference is that they include intrusion detection services, and the like. Using just one of the nodes for such functions can make such a node detectable and a target as such.

To address such a problem, the services running can cycle randomly amongst the nodes, making it difficult to determine which node is providing the noted functions. The DEAWP nodes also include services that can reach out and touch a possible attacker. For example, when such a decision is made by the swarm of nodes, one or all connected nodes can decide to hook onto the attacker and gather information about the attacker, or when needed even counterattack to stop the attack as a whole.

The DEAWP is also capable of handling the issue of false positives. As the network inserted DEAWP nodes function as a collective, they make decisions based on the findings of many/all nodes similar to how a voting system works. When a majority of DEAWP nodes find certain actions to be intrusive or look like a pending attack, they can collectively decide to no longer interact with that service/on a specific system to protect the other systems within that network. Now in order to make such decisions, the DEAWP node system can include one or more of signaling services (e.g., the number needed can vary but can be at least 2).

Accordingly, when one DEAWP node is attacked it will try to synchronize its findings with its peers. This means that each peering machine residing within the same network will try to swap all of their findings directly amongst themselves. All peering machines include the same data about possible attacks or anomalies as much as they can, or until they are rendered moot. Such data can be used to map the network and its potential threats.

If one DEAWP system signals a problem, it will try to tell the others to propagate the issue at hand to others, so they can be acknowledged by a DEAWP peer that will then start guarding the system it is trying to protect. The absence of one of these interval signals in itself is also considered possible attack information. In effect, all suitable connected DEAWP peers protect a specific network connected system, or have a secondary function as a node to provide obfuscation as potential targets and information gatherers.

If one DEAWP system is attacked or probed, it may consider itself as a potential threat to others and will try to limit itself and warn others. This is not a given, for it may react in other ways when the threat level is minimal. This is because the measures that can be taken are layered and can vary in functionality. The DEAWP system has the capability to interact with an attacker and try to find out more about the attacker automatically. It can also pretend it is something it is not, in order to obfuscate or frustrate an attacker, while gathering more useful information, and the like.

Referring now to the drawings, wherein like reference numerals designate identical or corresponding parts throughout the several views, and more particularly to FIG. 1 thereof, there is shown a distributed early attack warning platform (DEAWP), according to an illustrative embodiment if the present invention.

A system or router connected network includes nodes that can act as signaling systems that can inform users of a pending attack, and an infected/untrusted system can be isolated from the other protected systems.

In FIG. 1, the system includes wall socket connected power line Ethernet adaptors 100 communicating over a power line connection 101 between the wall socket connected adaptors 100.

Routers/nodes 102, also referred to as monitoring node devices, function as "bump in a wire" network nodes that sever the direct connection between network connected systems, the power line adaptors 100, and a router/network.

Communication links 108 connect the routers/nodes 102 to the adaptors 100.

Communication links 109 connect node protected systems 103, also referred to as protected computer devices, directly to the routers/nodes 102, thus severing a direct communication to both the regular network, also referred to as the first communication network, and the power line network, also referred to as the second communication network.

Communication links 110 provide filtered connections from the node protected systems 103 to conventional network routers 105 in a pre-warned state. Such connections can be continuously guarded by the shared information between all the nodes 102 that protect the network traffic and its systems. The nodes 102 can therefor exclude the node protected systems 103 from communicating with an infected/hacked system 104, for example, if it and other nodes 102 have been warned of a probing/attack like behavior by the infected/hacked system 104. The node protected systems 103 thus employ data goes to and comes from a network that is filtered by the shared knowledge of all the nodes 102. The infected/hacked system 104 is not connected via a protective node but rather only to one of the routers 105 via a communications link 107. A communications link 106 provides a connection between the conventional network routers 105.

Figure 2:
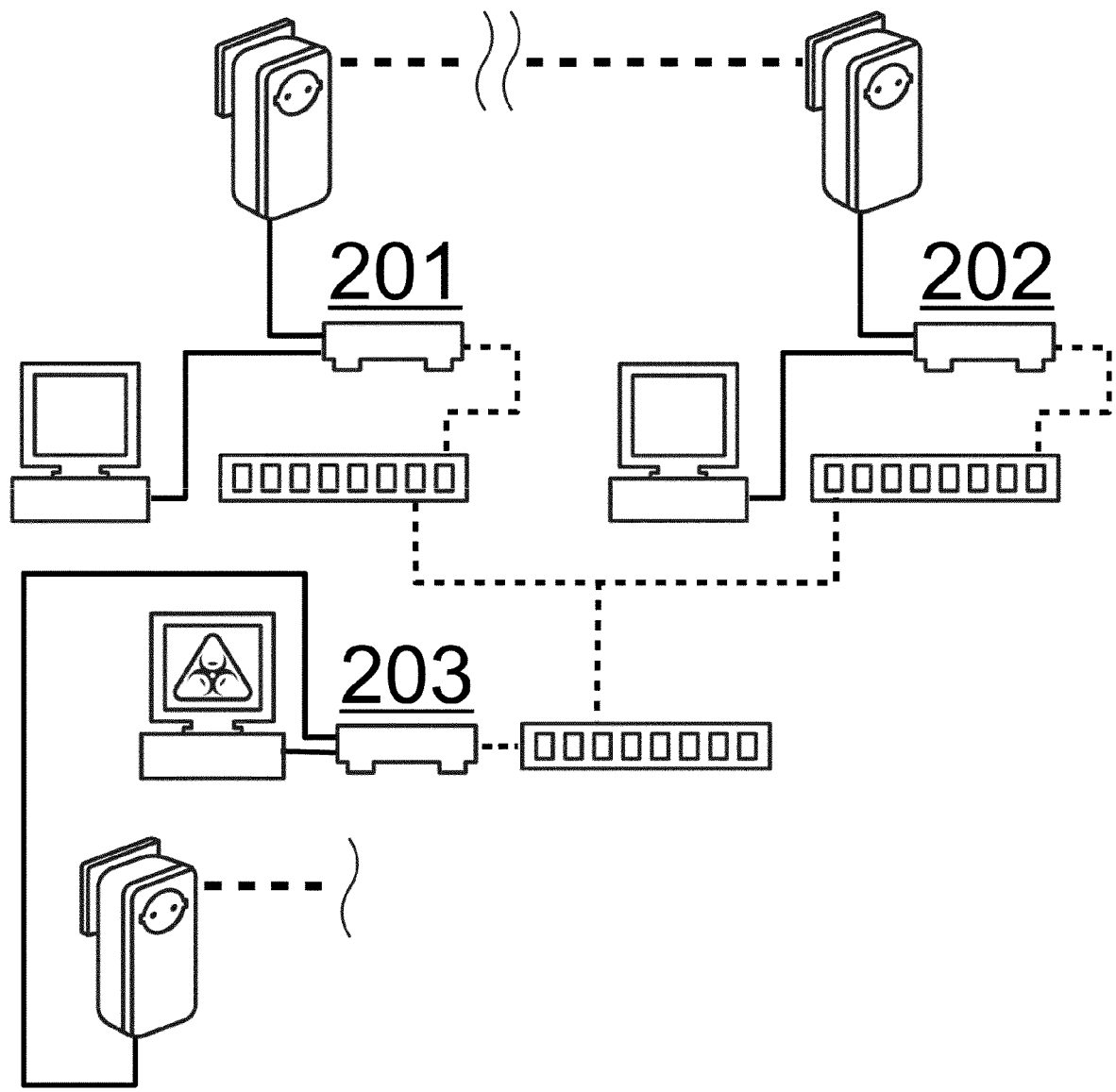
FIG. 2 is used to illustrate a system and method for a distributed early attack warning platform (DEAWP), according to another illustrative embodiment of the present invention.

FIG. 2 is used to illustrate a system and method for a distributed early attack warning platform (DEAWP), according to another illustrative embodiment of the present invention.

In FIG. 2, the system and method function as in the system and method of FIG. 1, except wherein routers or nodes 201 and 202 are clean nodes coupled to respective protected networks, and that can communicate with each other both the regular networks as well as the separate power line connections, so that they can communicate fully and uninhibited with the other systems, as no possible problem have been found by them or surrounding nodes.

The router or node 203 however is connected to a hacked/infected system that is protected by the node 203, which is impaired deliberately to prevent communications with harmful intentions from the hacked/infected system to the clean protected systems.

Figure 3:
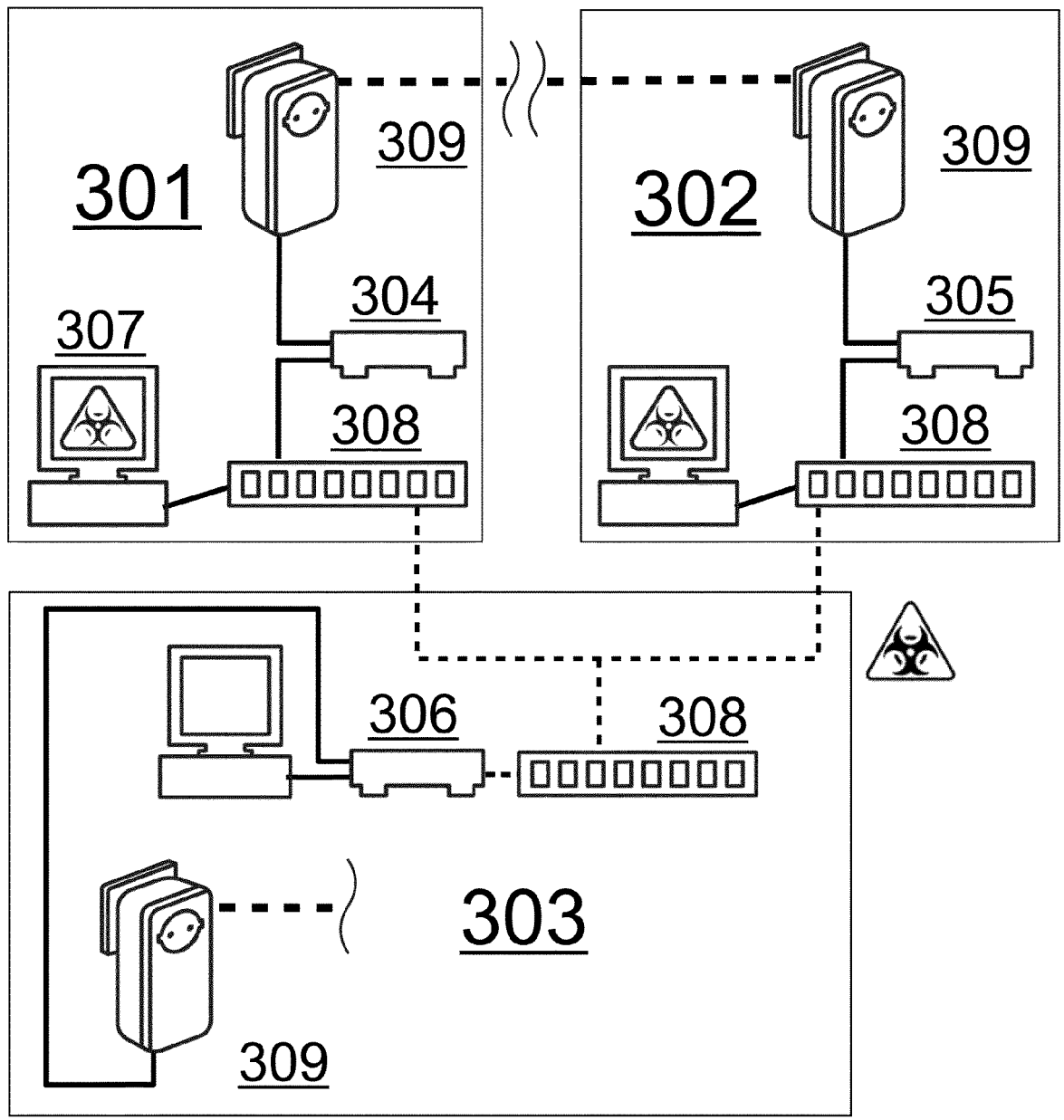
FIG. 3 is used to illustrate a system and method for a distributed early attack warning platform (DEAWP), according to further illustrative embodiment of the present invention.

FIG. 3 is used to illustrate a system and method for a distributed early attack warning platform (DEAWP), according to further illustrative embodiment if the present invention.

In FIG. 3, the system and method function as in the systems and methods of FIGS. 1-2, except wherein passive signaling only nodes or routers 304 and 305 are provided respectively in networks 301 and 302, and a node or router 306 configured a "bump in a wire" is provided in network 303. The network 301 includes an infected/hacked system 307. The nodes or routers 304, 305 and/or 306 can use the conventional network routers 308 and/or power line adapters 309, advantageously, to determine that the infected/hacked system 307 has been compromised, so as to take appropriate actions, as previously described.

Figure 4:
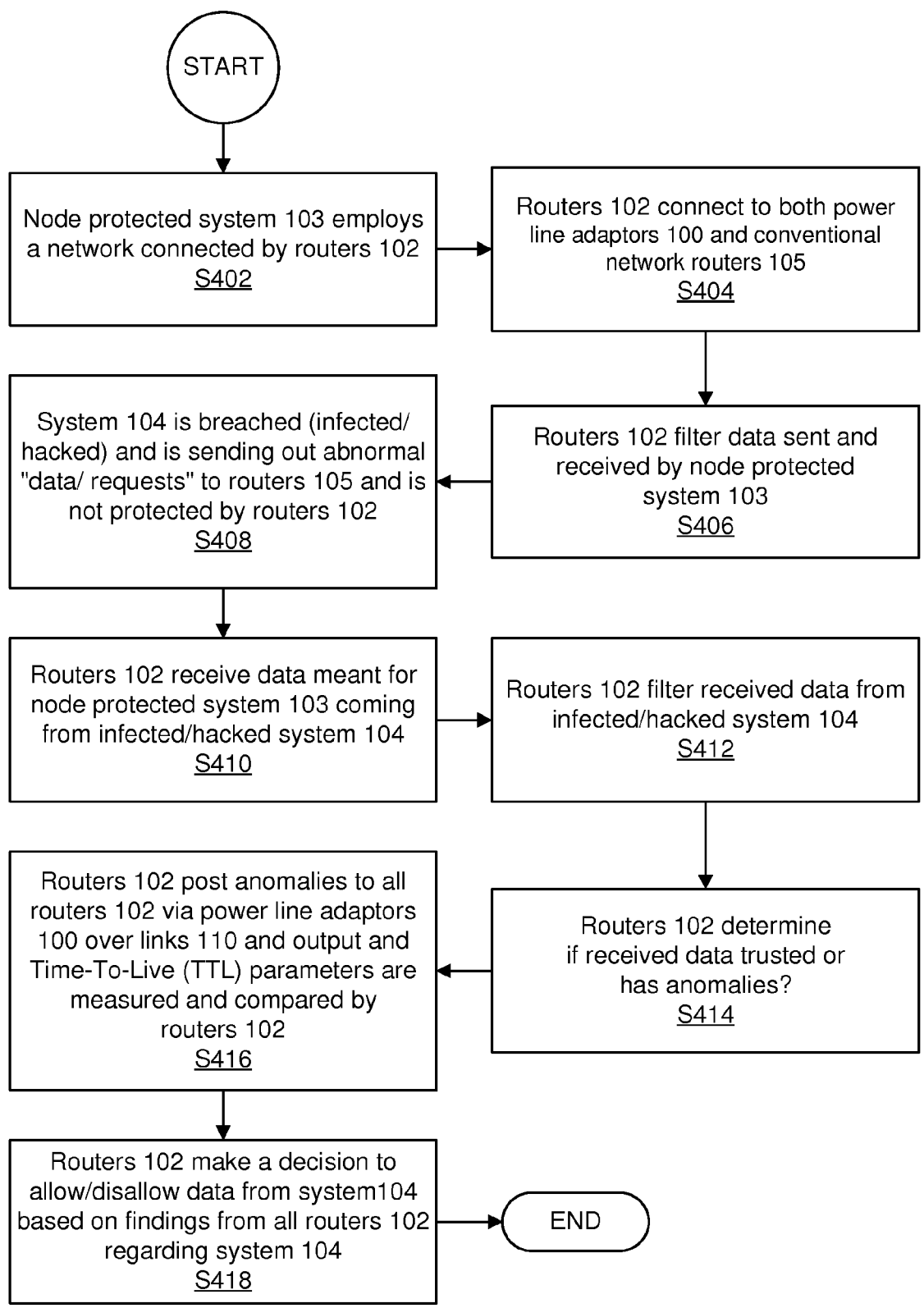
FIG. 4 is flowchart used to illustrate the system and method for the distributed early attack warning platform (DEAWP) of FIG. 1, according to an illustrative embodiment of the present invention.

FIG. 4 is flowchart used to illustrate the system and method for the distributed early attack warning platform (DEAWP) of FIG. 1, according to an illustrative embodiment of the present invention.

In FIG. 4, the process starts at step 402, wherein the node protected system 103 employs a network connected by the routers 102. The Routers 102 connect to both power line adaptors 100 and conventional network routers 105, at step 404. The routers 102 filter data sent and received by the node protected system 103, at step 406. The system 104 is breached (e.g., infected/hacked) and is sending out abnormal "data/requests" to routers 105 and is not protected by routers 102, at step 408. The routers 102 receive data meant for the node protected system 103 coming from the infected/hacked system 104, at step 410. The routers 102 filter the received data from the infected/hacked system 104, at step 412. The routers 102 determine if the received data is trusted or has anomalies, at step 414. The routers 102 post anomalies to all of the routers 102 via the power line adaptors 100 over the communication links 110, and output and Time-To-Live (TIL) parameters are measured and compared by the routers 102, at step 416. The routers 102 make a decision to allow/disallow data from the system 104 based on findings from all of the routers 102 regarding the system 104, at step 418, completing the process.

Figure 5:
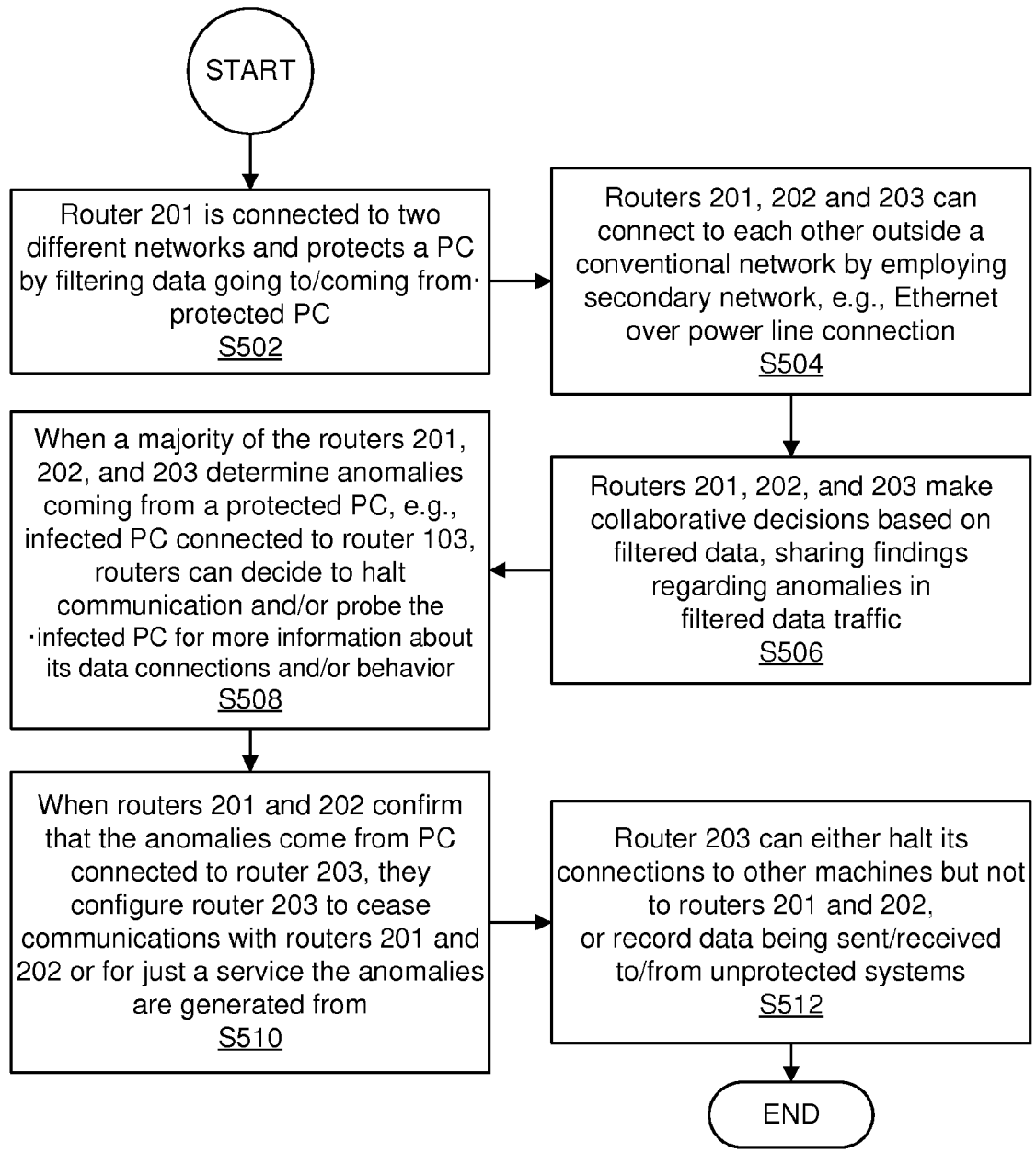
FIG. 5 is flowchart used to illustrate the system and method for the distributed early attack warning platform (DEAWP) of FIG. 2, according to an illustrative embodiment of the present invention

FIG. 5 is flowchart used to illustrate the system and method for the distributed early attack warning platform (DEAWP) of FIG. 2, according to an illustrative embodiment of the present invention.

In FIG. 5, the process starts at step 502, wherein the router/node 201 is connected to two different networks and protects a computer device, such as a PC, by filtering data going to/coming from the protected PC. The routers 201, 202 and 203 can connect to each other outside a conventional network (the first communication network) by employing secondary network (second communication network), e.g., Ethernet over power line connection, at step 504. The routers 201, 202, and 203 make collaborative decisions based on filtered data, sharing findings regarding anomalies in the filtered data traffic, at step 506. When a majority of the routers 201, 202, and 203 determine anomalies coming from a protected PC, e.g., infected PC connected to the router 103, the routers can decide to halt communication and/or probe the infected PC for more information about its data connections and/or behavior, at step 508. When the routers 201 and 202 confirm that the anomalies come from the PC connected to router 203, they configure the router 203 to cease communications with the routers 201 and 202 or for just a service the anomalies are generated from, at step 510. The router 203 can either halt its connections to other machines but not to routers 201 and 202, or record data being sent/received to/from unprotected systems, at step 512, completing the process.

Figure 6:
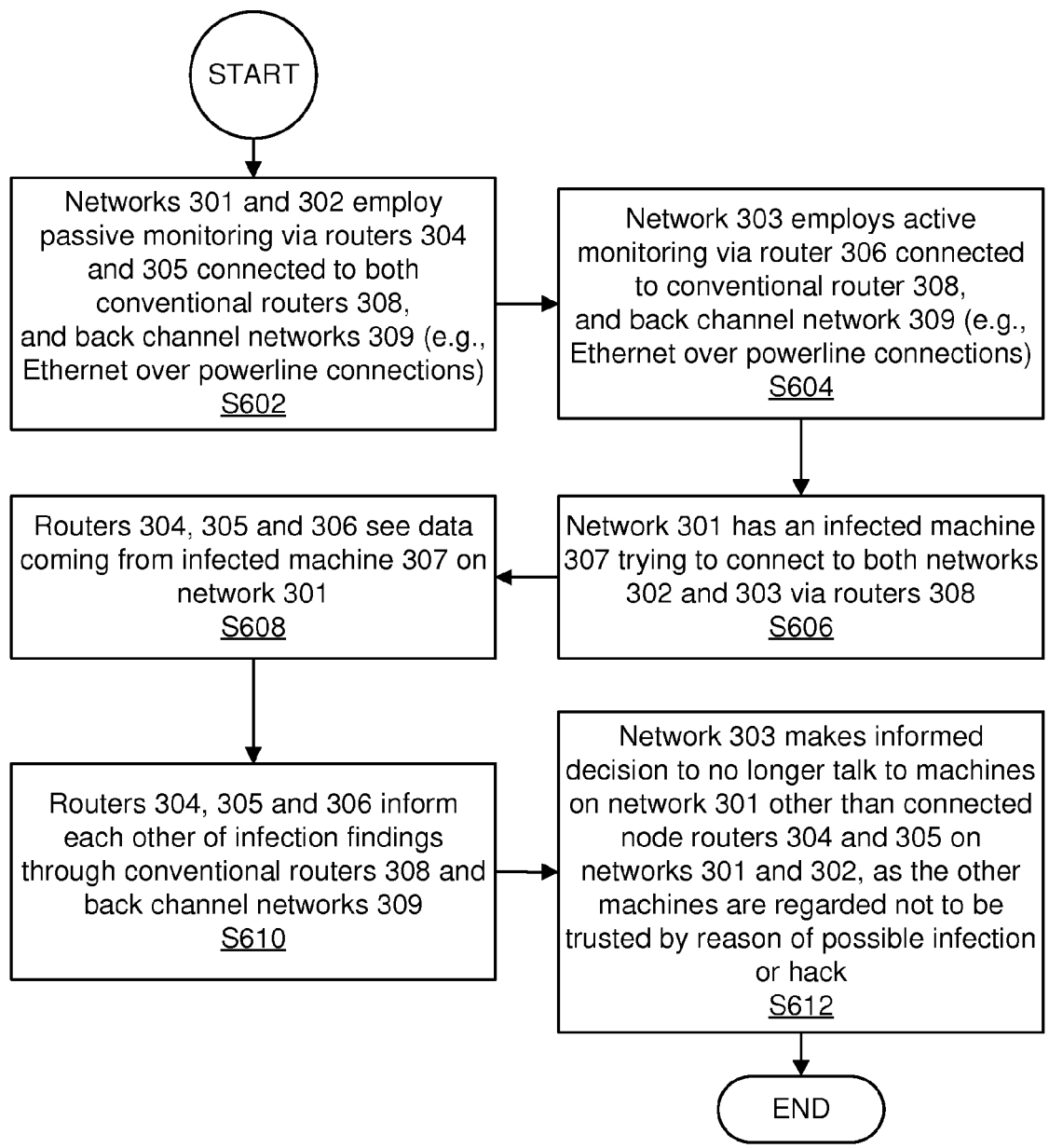
FIG. 6 is flowchart used to illustrate the system and method for the distributed early attack warning platform (DEAWP) of FIG. 3, according to an illustrative embodiment of the present invention.

FIG. 6 is flowchart used to illustrate the system and method for the distributed early attack warning platform (DEAWP) of FIG. 3, according to an illustrative embodiment of the present invention.

In FIG. 6, the process starts at step 602, wherein the networks 301 and 302 employ passive monitoring via the routers 304 and 305 connected to both of the conventional routers 308, and back channel networks 309 (e.g., Ethernet over powerline connections). The network 303 employs active monitoring via the router 306 connected to the conventional router 308, and the back channel network or second communication network 309 (e.g., Ethernet over powerline connections), at step 604. The network 301 has an infected machine/computer device 307 trying to connect to both of the networks 302 and 303 via the routers 308, at step 606. The routers 304, 305 and 306 see the data coming from the infected machine/computer device 307 on the network 301, at step 608. The routers 304, 305 and 306 inform each other of the infection findings through the conventional routers 308 (the first communication network) and the back channel networks 309, at step 610. The network 303 makes an informed decision to no longer talk to the machines on the network 301, other than the connected node routers 304 and 305 on the networks 301 and 302, as the other machines are regarded not to be trusted by reason of possible infection or hack, at step 612, completing the process.

Figure 7:
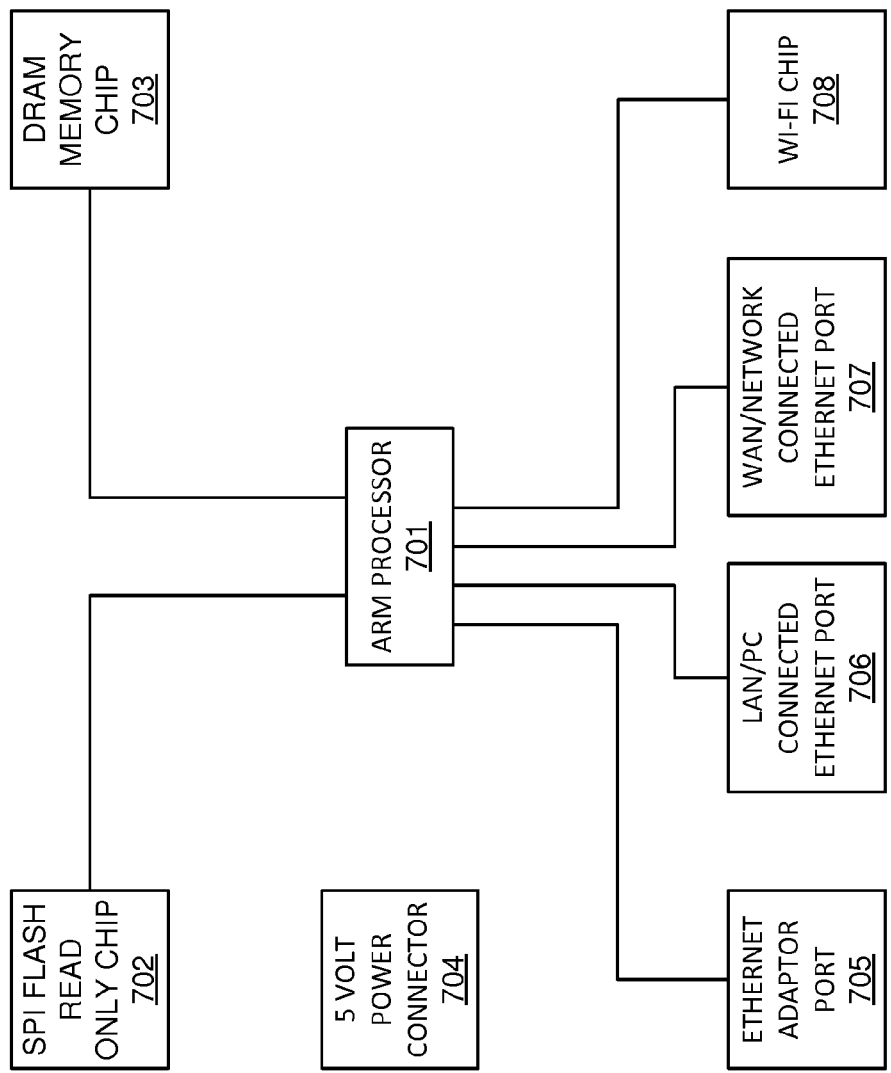
FIG. 7 is used to illustrate a monitoring node for the systems and methods for the distributed early attack warning platform (DEAWP) of FIGS. 1-6, according to an illustrative embodiment of the present invention.

FIG. 7 is used to illustrate a monitoring node (e.g., monitoring nodes 102, 210-203, and 305-306) for the systems and methods for the distributed early attack warning platform (DEAWP) of FIGS. 1-6, according to an illustrative embodiment of the present invention.

In FIG. 7, a monitoring node device can include an ARM processor 701 (e.g., one of a family of CPUs based on the RISC (reduced instruction set computer) architecture developed by Advanced RISC Machines (ARM), with 32-bit and 64-bit RISC multi-core processors).

The ARM processor 701 is configured to process routing software, and the like.

A Serial Peripheral Interface (SPI) flash, read only memory chip 702 is provided and configured for storing the routing software, and the like, residing in binary form, and the like.

A Dynamic Random Access Memory (DRAM) chip 703 is configured to store processing instructions and for providing buffering for the SPI flash chip 702 when turned on.

A power connector 704 (e.g., 5 volt) is provided to supply power to the monitoring node device.

A routed power connector 705 is provided and configured to also function as an Ethernet adaptor port.

A LAN/PC connected Ethernet port 706 is provided and configured to supply an address to a protected computer device so communications can be routed over a TCP/IP connection, and the like.

A wide area network (WAN) connected Ethernet port 707 is provided and configured to receive an address for routing the data sent via the Ethernet port 706.

A Wi-Fi chip 708 is provided and configured to provide access point functionality to provide LAN functionality, for example, for maintenance purposes, fall back network access, and the like.

Figure 8:
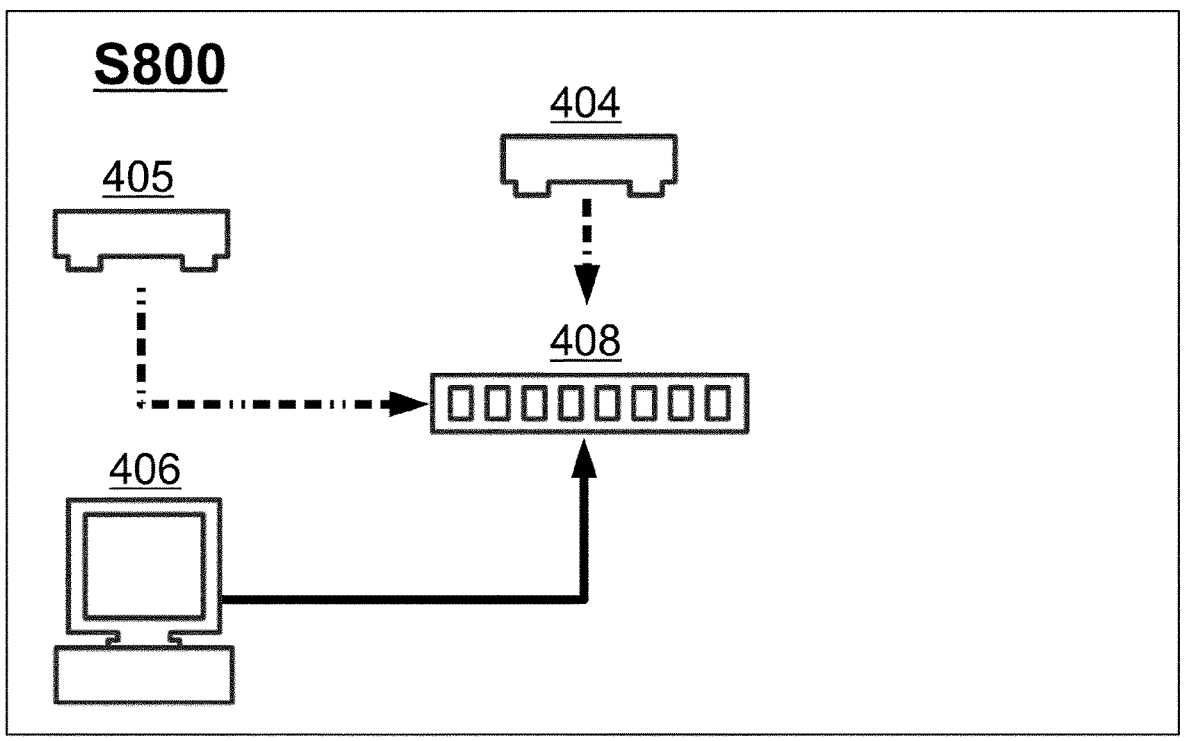
FIG. 8 is used to illustrate a process for collecting data by nodes.
Figure 8:
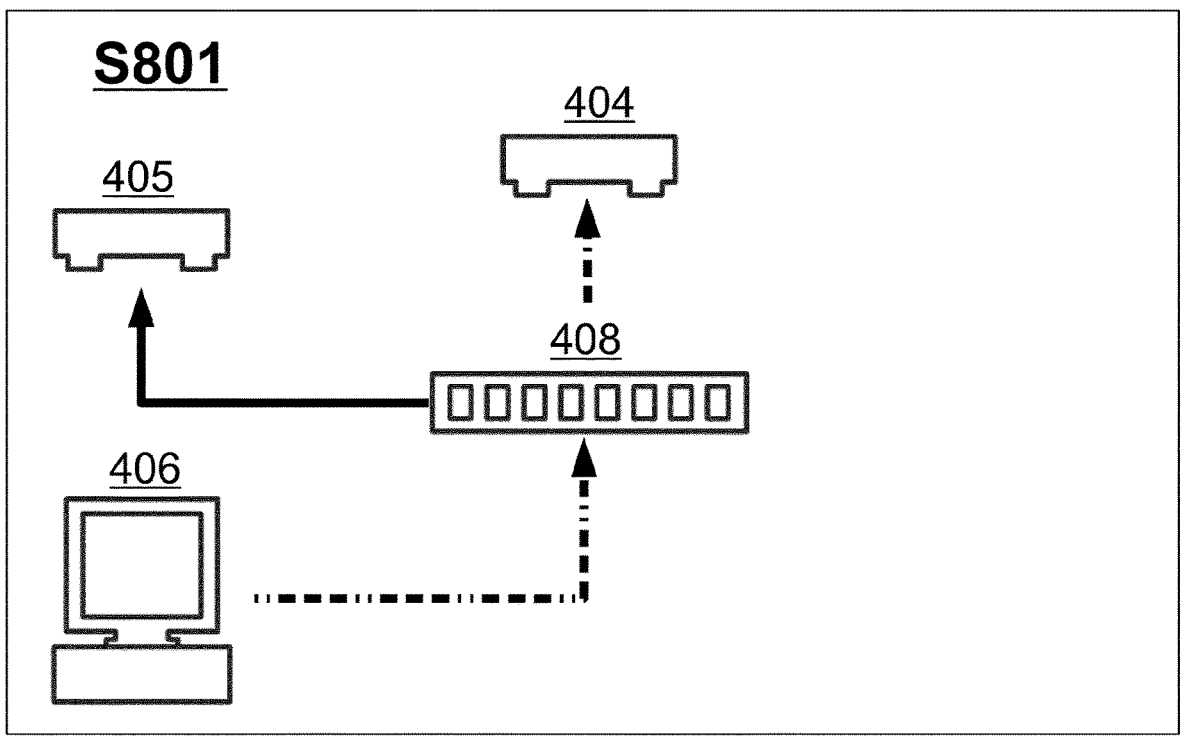
Figure 14:
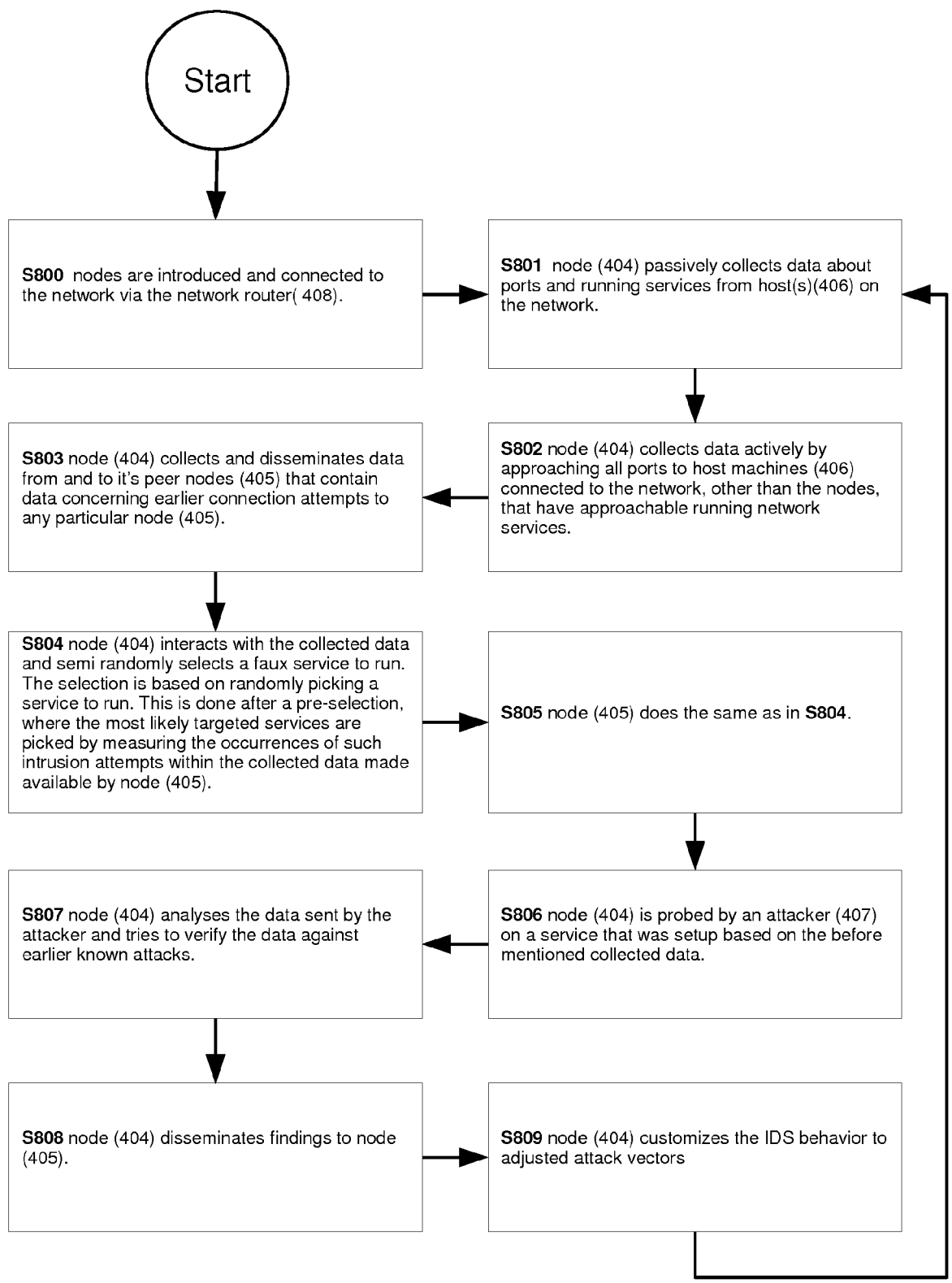
FIG. 14 is a detailed flowchart to illustrate operation of the reflective intrusion detection system of FIG. 13.

FIGS. 8 and 14 are used to illustrate a process for collecting data by nodes. In FIGS. 8 and 14, at steps 8800 and 8801, the nodes 404 and 405 are introduced and connected to the network via the network router 408. The introduced nodes 404 and 405 collect data about available systems 406 within the network they reside in. The nodes 404 and 405 then passively collect data about ports and running services from systems connected to each network.

Figure 9:
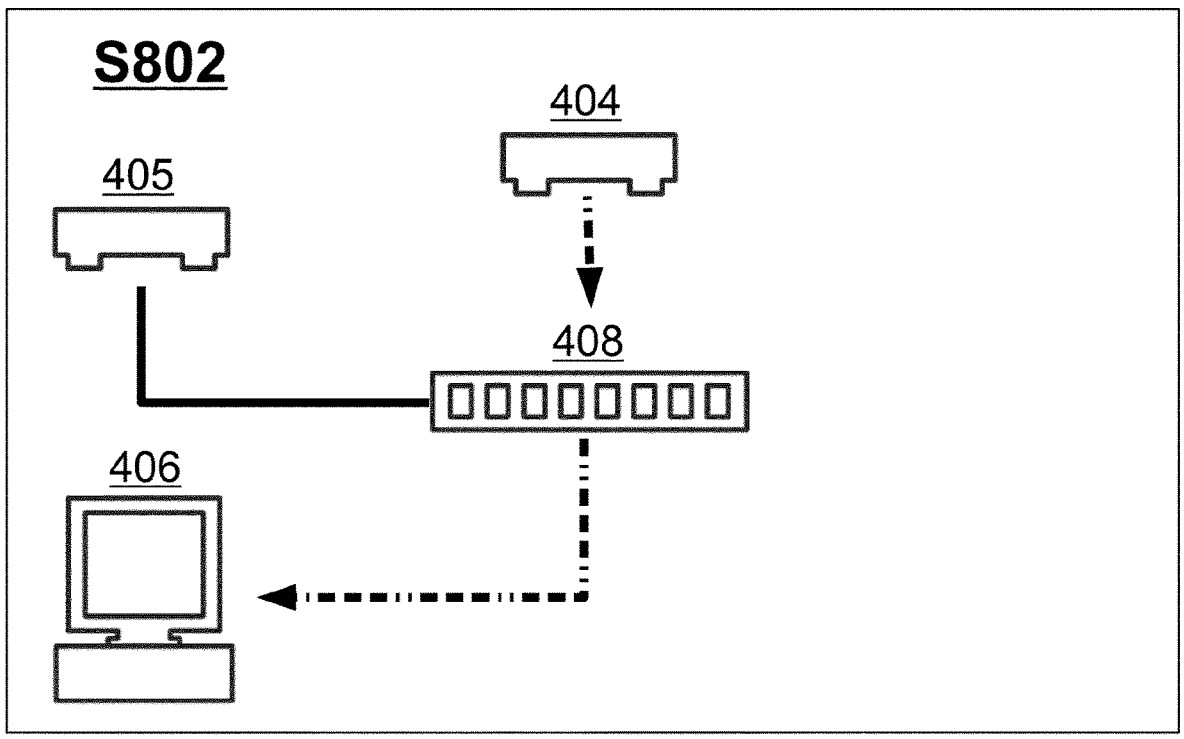
FIG. 9 is used to illustrate a process for nodes to collect and disseminate data from peer nodes.
Figure 9:
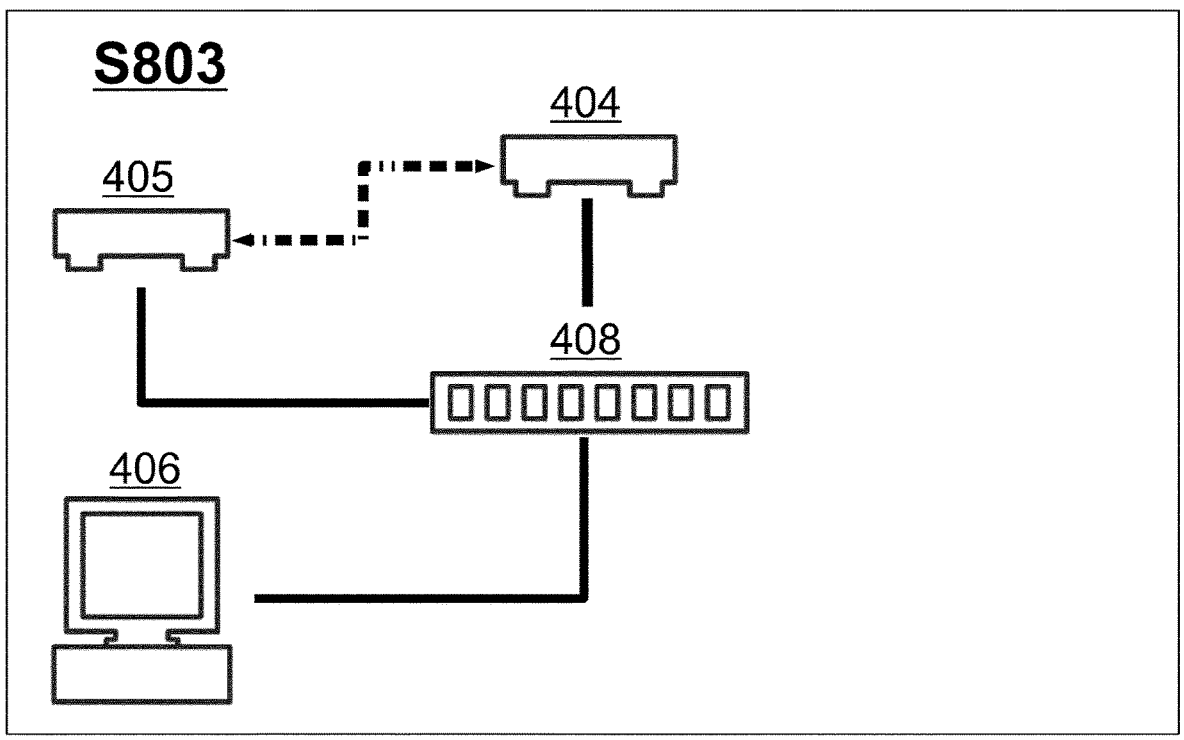

FIGS. 9 and 14 are used to illustrate a process for nodes to collect and disseminate data to peer nodes. In FIGS. 9 and 14, at step 8802 and 8803, the nodes 404 and 405 collect data actively by approaching all suitable ports to machines 406 connected on the network via the network router 408, other than the nodes 404 and 405, that have approachable running network services. The node 404 collects and disseminates data from and to it's peer nodes 405 that contain data concerning earlier connection attempts to any particular node 405 or 404.

Figure 10:
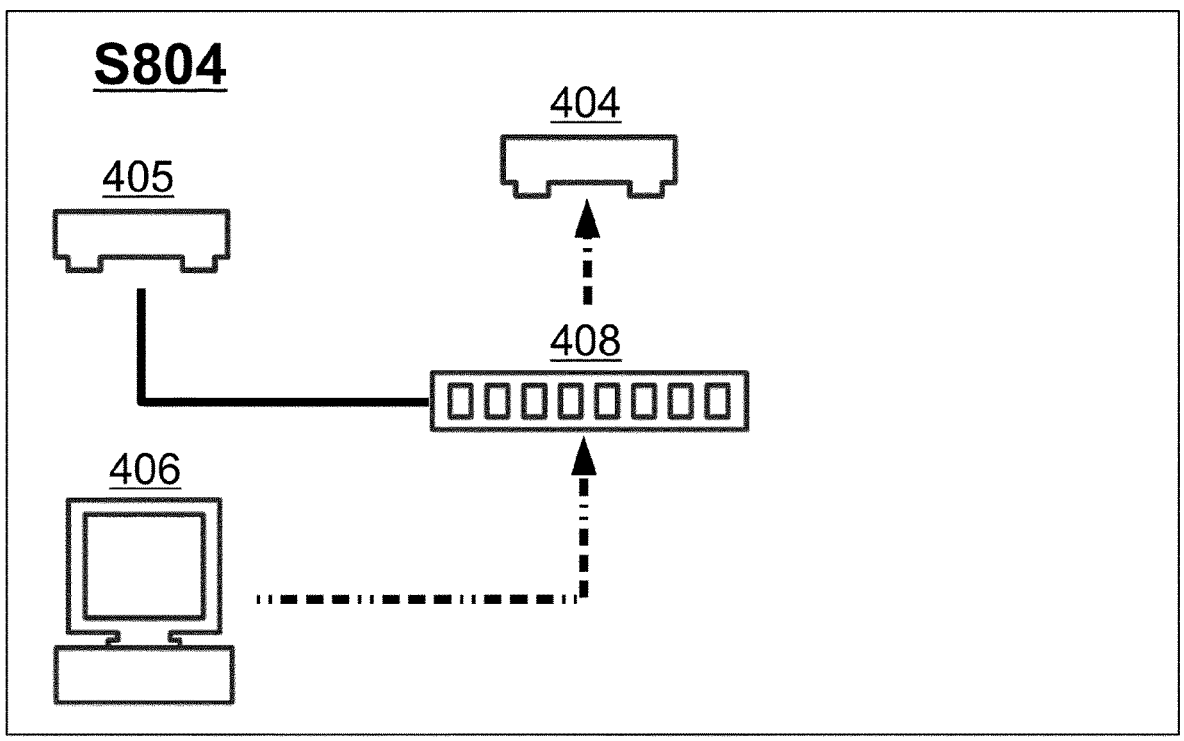
FIG. 10 is used to illustrate a process for a node to interact with collected data to create a faux service run to attract attackers.
Figure 10:
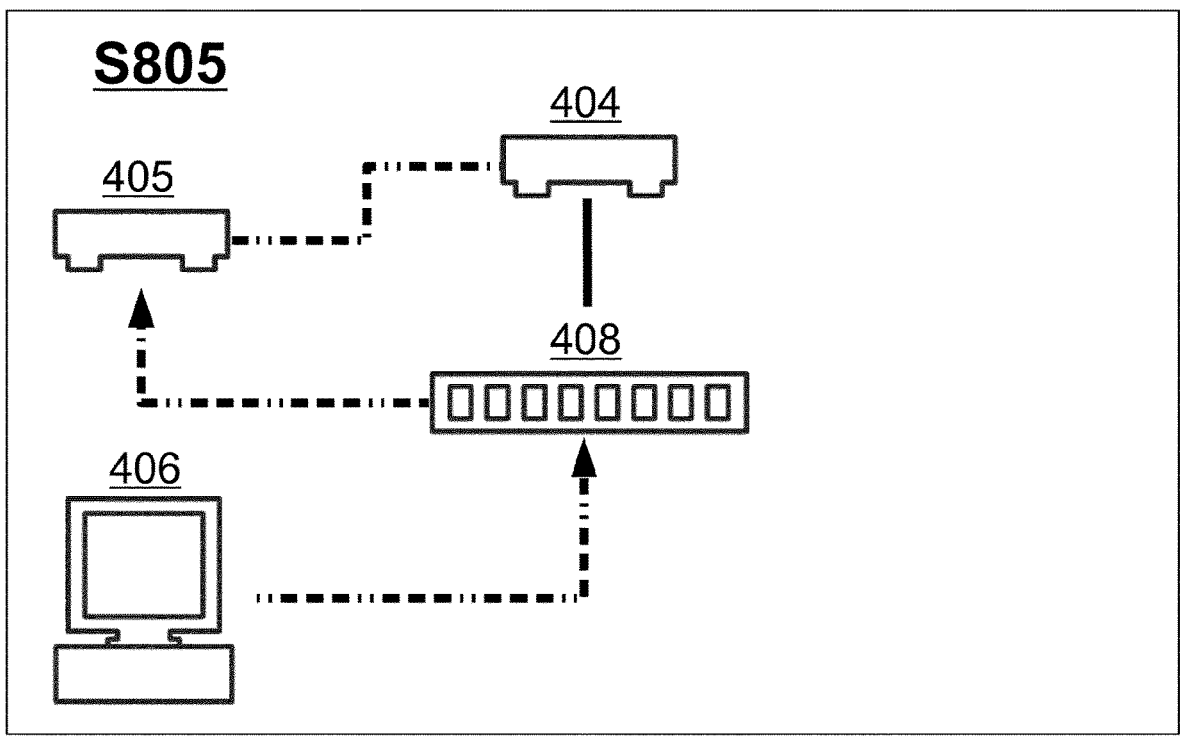

FIGS. 10 and 14 are used to illustrate a process for a node to interact with collected data to create a faux service run to attract attackers. In FIGS. 10 and 14, at steps 8804 and 8805, the node 404 is interacting with the collected data and semi randomly creates a faux service to run. The selection is based on randomly picking a service to run and emulating it. This is done after a pre-selection, where the most likely targeted services are picked by measuring the occurrences of such intrusion attempts within the collected data made available by the node 405. The node 405 in turn does the same as the node 404.

Figure 11:
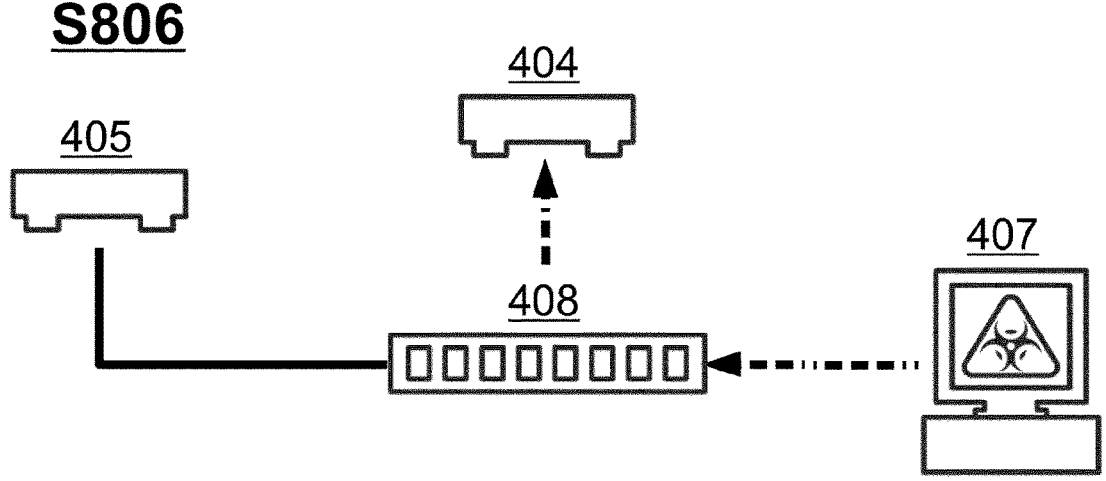
FIG. 11 is used to illustrate a process for analysis of data sent by an attacker to a node.
Figure 11:
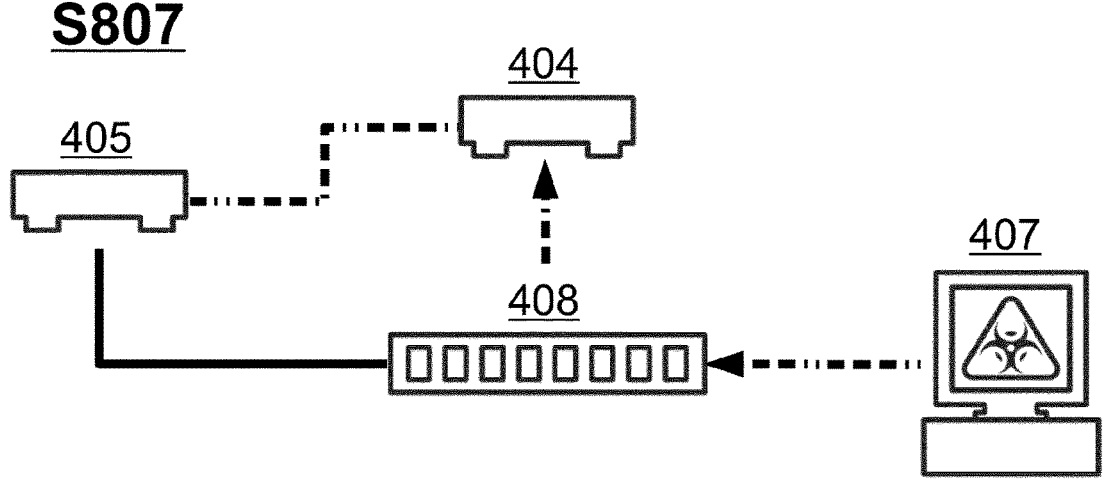

FIGS. 11 and 14 are used to illustrate a process for analysis of data sent by an attacker to a node. In FIGS. 11 and 14, at steps S806 and 807, the node 404 is probed by an attacker 407 on a service that was setup based on the collected data, as previously described. The node 404 analyzes the data sent by the attacker 407 and tries to verify the received data to earlier known attacks.

Figure 12:
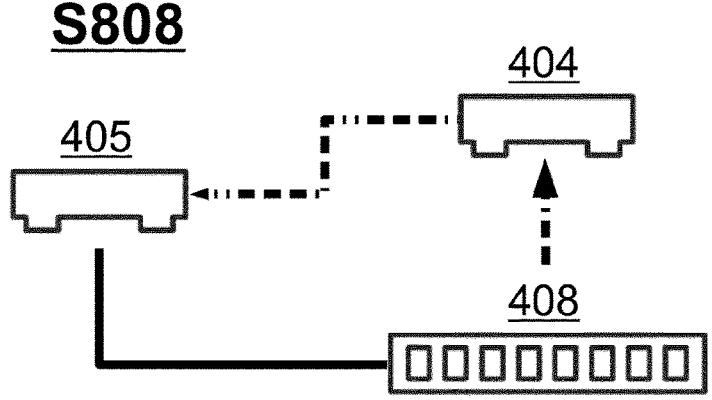
FIG. 12 is used to illustrate a process for findings of nodes to be disseminated to other nodes.
Figure 12:
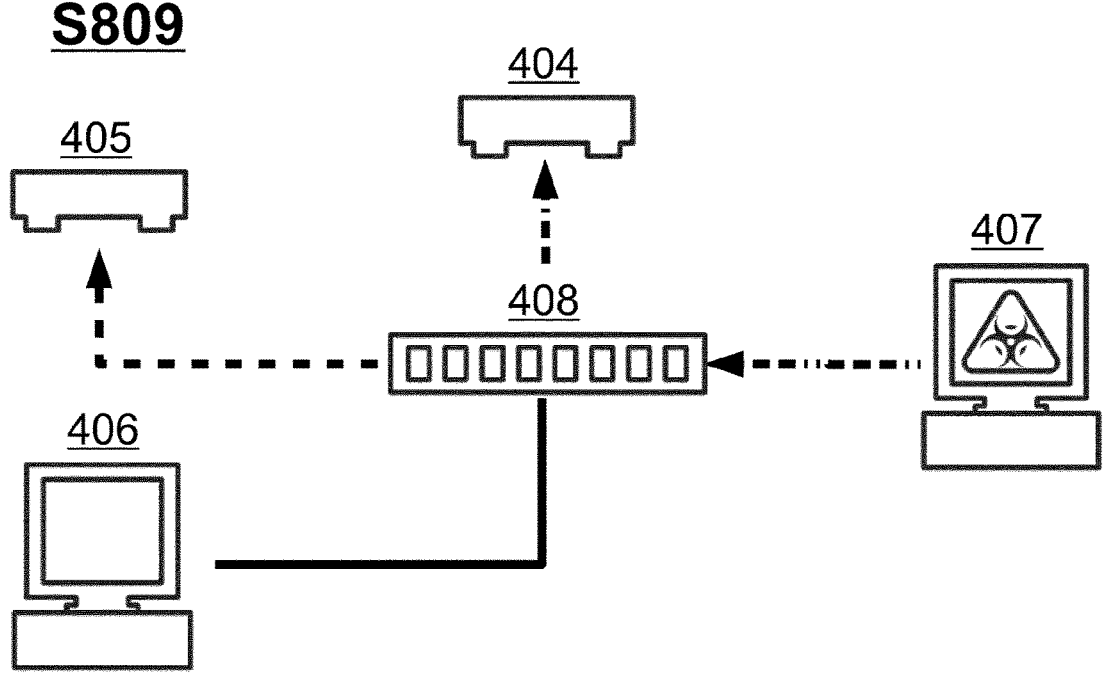

FIGS. 12 and 14 are used to illustrate a process for findings of nodes to be disseminated to other nodes. In FIGS. 12 and 14, at steps S808 and S809, the node 404 disseminates its findings to the node 405. Both the nodes 405 and 404 then adjust their IDs behavior to adjust attack vectors with the new information they have now received from each other.

Figure 13:
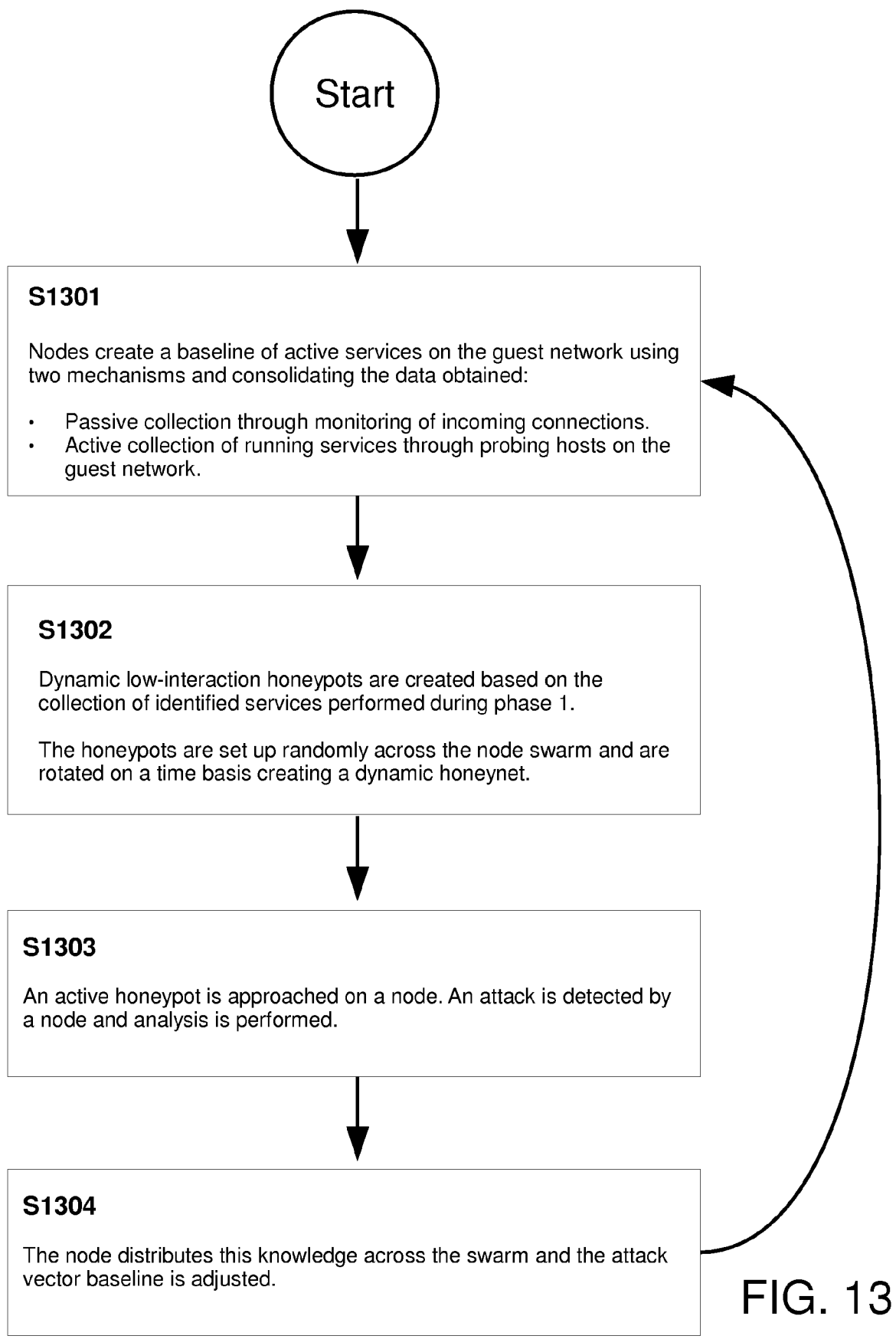
FIG. 13 is a high level flowchart to illustrate phases and methodology for operation of a reflective intrusion detection system.

FIG. 13 is a high level flowchart to illustrate phases and methodology for operation of a reflective intrusion detection system. In FIG. 13, the phases and method of how the reflective intrusion detection system works are illustrated, wherein steps S1301 to S1304 are the process phases. For example, at step S1301, nodes create a baseline of active services on a guest network using, for example, including a plurality of mechanisms and then consolidating the data obtained. Such mechanisms can include passive collection through monitoring of incoming connections, active collection of running services through probing hosts on a guest network, and the like. At step S1302, dynamic low-interaction honeypots are created based on the collection of identified services performed during phase 1, step S1301. The honeypots are set up randomly across the node swarm and are rotated on a time basis creating a dynamic honeynet. At step S1303, an active honeypot is approached on a node, so that an attack can be detected by a node and suitable analysis performed, as previously described. Finally, at step S1304, a suitable node distributes the gained knowledge across the swarm of nodes and the attack vector baseline is adjusted, as needed, completing the process and with control returning to step S1301.

FIG. 14 is a detailed flowchart to illustrate operation of the reflective intrusion detection system of FIG. 13, and as described with respect to FIGS. 8-12. Accordingly, the flowchart of FIG. 14 illustrates how the reflective intrusion detection system works interactively in a more detailed fashion, wherein steps S800 to S809 are used to illustrate the details of the process, as previously described.

Accordingly, the DEAWP system (e.g., referred to as a monitoring node device), can include all suitable hardware and/or software needed to perform the functions, as described above. For example, a dual network monitoring system, can include two separated network entry points with separated functionality, wherein one of the separated networks can be used for forming and informing a regular network (first communication network) and the other of the separated networks (the second communication network) can be used to form and inform a network of DEAWP monitoring systems (e.g., nodes). Advantageously, the monitoring node devices of can work together, as a swarm, and the like, controlling choices and adaptations regarding possible threat scenarios.

The swarm can create a synergetic relationship between the connected DEA WP monitoring systems, enhancing the quality of the anti-threat decision making process. The swarm can also form its own separated network by way of connection through a TCP/IP over power line network, and the like, that serves the monitoring node devices. The swarm connected through the TCP/IP over power line network, makes the network data that can travel over it faster. Advantageously, the swarm can interact faster, making pre-empting, filtering, protecting, and the like, decisions, regarding possible threats, before harm can be done to protected systems.

The networking of the swarm can also be accomplished through any other suitable medium that can connect the nodes of on a network, including wireless, microwave, and the like connections. Advantageously, the dual network setup reduces the possibility of false positives and therefore increases the system's reliability regarding threats, by way of threat level consideration through the swarm. In addition, the dual network setup also increases the chance of appropriate counteraction against a perceived threat through the combination of the functionality of the swarm of and the threat level consideration.

The protection of the set of DEAWP monitoring nodes and their separate network, through redundancy, can employ many monitoring nodes, and handle a loss of one of such nodes, including a node being breached, under attack, infected, and the like.

Advantageously, the loss of a node also can form a signal to the other connected nodes forming the swarm that the network/system is under attack. In addition, the loss of a node also can form a signal to the other connected nodes forming the swarm that the lost node is moot, by way of locking the lost node out of the swarm, making it impossible for the lost node to do further harm.

The swarm can include functionality that coordinates countermeasures over the separated network so that no notice or information about such countermeasures is given over the attacked network/system the swarm protects. Advantageously, the swarm can gather information about a possible hostile entity, entities, and the like, without being detected by the hostile entity, entities, and the like, through the use of the separated network. For example, circumvention of distributed denial-of-service (DDoS) attacks through the use of the separate network, allows the swarm to share information, coordinate countermeasures, and the like, while under attack.

The nodes can include functionality that allows the nodes to individually be capable of obfuscating threats, and the like, through the use of, for example, intrusion detection systems, service rotation systems, and the like, making the obfuscating node appealing to such threats, drawing the threats away from possible real targets, and the like. The swarm can include functionality that checks the individual nodes for integrity, health, and the like, making it possible to deactivate or circumvent nodes that are regarded as nonfunctional by the swarm.

The nodes can include functionality that allows the nodes to be capable of individual interaction with threats, to have individual countermeasure capabilities, to be capable of synergizing with other individual nodes connected by way of the swarm so as to make group decisions on how the individual nodes should individually deal with a threat, attack, and the like. Advantageously, such individually executed countermeasures can still be the result of a group decision made by the swarm. In addition, the nodes can include functionality that allows the nodes to algorithmically rotate monitoring or attack functions, and the like, randomized or on request by other peering nodes, and the like. For example, requests by other nodes can include several tasks being divided on a per node basis to share a task, workload, function, and the like.

Although the present invention is described in terms of employing a secondary network connected to a TCP/IP network over a power line connection, and the like, any other suitable types of TCP/IP network connections can be employed, as will be appreciated by those of ordinary skill in the relevant art(s).

Accordingly, the above-described devices and subsystems of the illustrative embodiments can include, for example, any suitable servers, workstations, PCs, laptop computers, personal digital assistant (PDAs), Internet appliances, handheld devices, cellular telephones, wireless devices, other electronic devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, 3G, 4G, 5G, etc., LongTerm Evolution (LTE), communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, volatile or non-volatile memory, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention has been described in connection with a number of illustrative embodiments and implementations, the present invention is not so limited, but rather covers various modifications and equivalent arrangements, which fall within the purview of the appended claims.

The invention claimed is:

1. A system for a distributed early attack warning platform (DEAWP), the system comprising:
   a plurality of protected computer devices coupled to a first communications network;
   a plurality of monitoring node devices respectively coupled between the plurality of protected computer devices and the first communications network and configured to monitor data communications transmitted over the first communications network between the plurality of protected computer devices; and
   a second communications network separate from the first communications network coupled to the plurality of monitoring node devices, wherein data transmission in the second communication network is faster than in the first communication network,
   wherein based on the monitored data communications transmitted over the first communications network, the plurality of monitoring node devices are configured to communicate information over the second communications network regarding potential cyber-threats on the plurality of protected computer devices or the first communications network.

2. The system of claim 1, wherein the second network has less nodes interfering with the connection speed than the first network.

3. The system of claim 1, wherein the second communications network is a wireless network.

4. The system of claim 1, wherein the plurality of monitoring node devices act as a swarm and the monitoring node devices are configured for collectively controlling choices and adaptations regarding the potential cyber threats.

5. The system of claim 4, wherein the swarm is configured to coordinate countermeasures over only the second communications network.

6. The system of claim 4, wherein the swarm is configured to gather information regarding possible hostile entity or entities related to the cyber threats over the second communications network.

7. The system of claim 1, wherein the monitoring node devices are arranged to detect absence of interval signals of other monitoring node devices and if absence of the interval signals is detected, consider the absence as possible attack information.

8. The system of claim 1, wherein the respective first and second communications networks run on different physical network layers.

9. A computer implemented method for a system for a distributed early attack warning platform (DEAWP), the method comprising:
   coupling a plurality of protected computer devices to a first communications network;
   respectively coupling a plurality of monitoring node devices between the plurality of protected computer devices and the first communications network and monitoring with the plurality of monitoring node devices data communications transmitted over the first communications network between the plurality of protected computer devices;
   coupling a second communications network separate from the first communications network to the plurality of monitoring node devices, wherein data transmission in the second communication network is faster than in the first communication network; and
   based on the monitored data communications transmitted over the first communications network, the plurality of monitoring node devices communicating information over the second communications network regarding potential cyber-threats on the plurality of protected computer devices or the first communications network.

10. The method of claim 9, wherein the first communications network is a wired or wireless communications network, and the second communications network is a wireless communications network.

11. The method of claim 9, further comprising:
    collectively controlling via the monitoring node devices acting as a swarm of monitoring node devices choices and adaptations regarding the potential cyber-threats.

12. The method of claim 9, wherein the respective first and second communications networks run on different physical network layers.

13. A computer program product for method for a system for a distributed early attack warning platform (DEAWP), and including one or more computer readable instructions embedded on a tangible, non-transitory computer readable medium and configured to cause one or more computer processors to perform the steps of:
    coupling a plurality of protected computer devices to a first communications network;
    respectively coupling a plurality of monitoring node devices between the plurality of protected computer devices and the first communications network and monitoring with the plurality of monitoring node devices data communications transmitted over the first communications network between the plurality of protected computer devices;
    coupling a second communications network separate from the first communications network to the plurality of monitoring node devices, wherein data transmission in the second communication network is faster than in the first communication network; and
    based on the monitored data communications transmitted over the first communications network, the plurality of monitoring node devices communicating information over the second communications network regarding potential cyber-threats on the plurality of protected computer devices or the first communications network.

14. The computer program product of claim 13, wherein the first communications network is a wired or wireless communications network, and the second communications network is a wireless communications network.

15. The computer program product of claim 13, wherein the respective first and second communications networks run on different physical network layers.

* * * * *